May 3, 1966  N. M. POLLACK  3,249,119
SEAL ASSEMBLY
Filed Nov. 15, 1962  3 Sheets-Sheet 2
FIG. 3
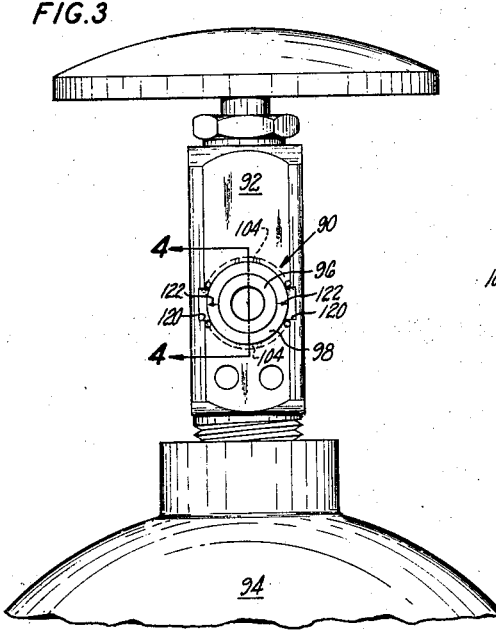
FIG. 5
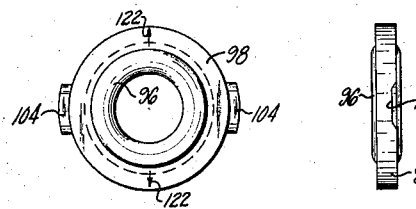
FIG. 6
FIG. 4
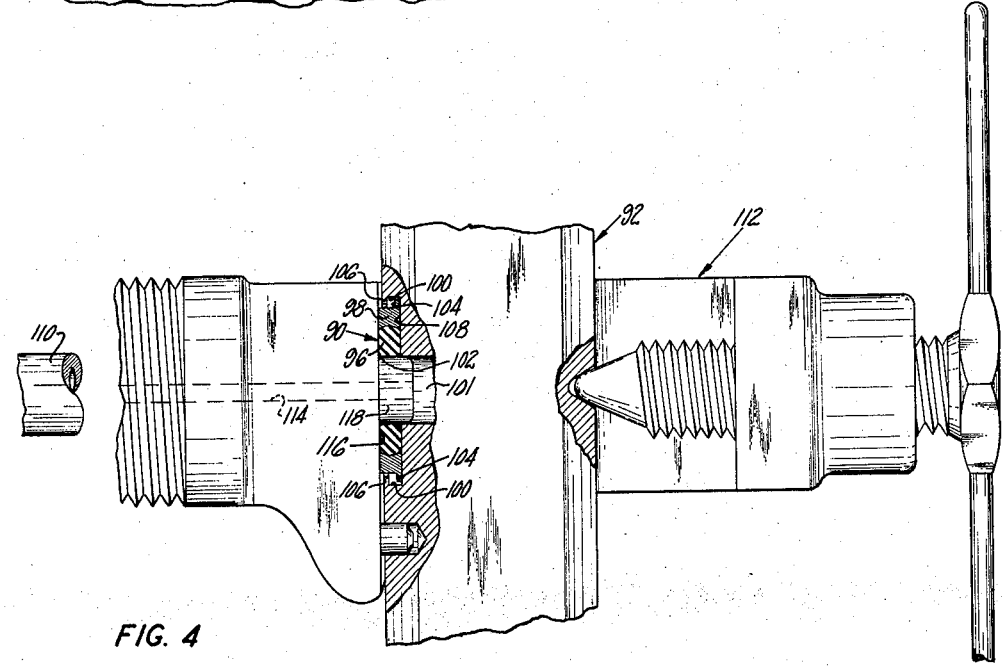
INVENTOR.
NATHAN M. POLLACK
BY Lindsey, Prutzman and Hayes
ATTORNEYS

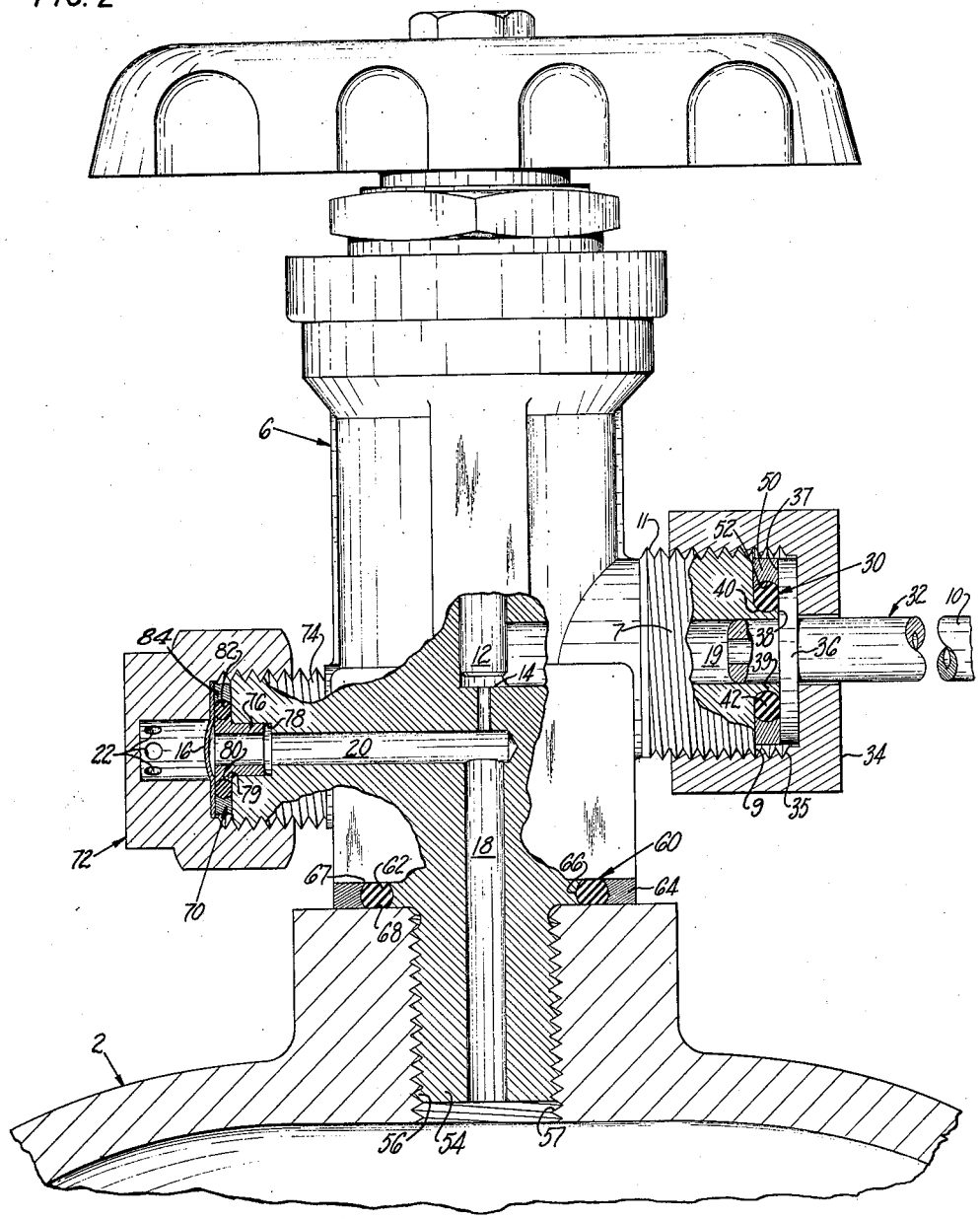

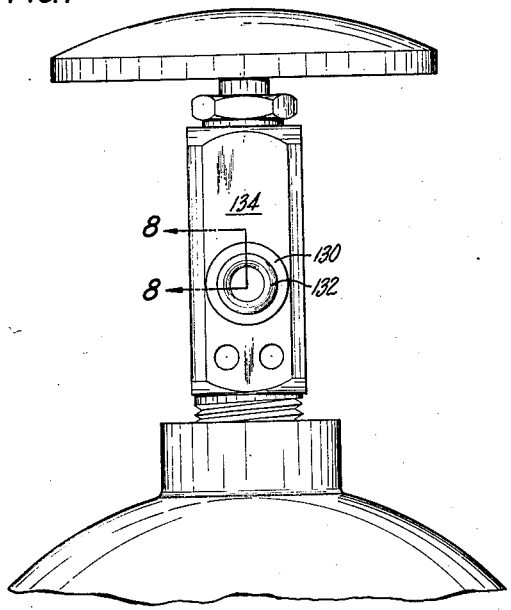
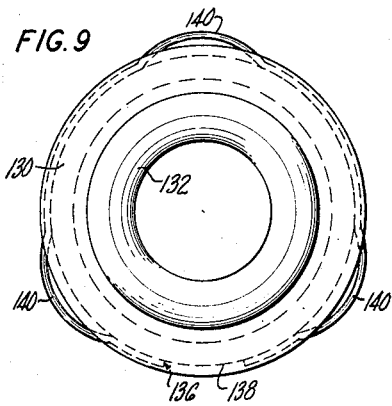
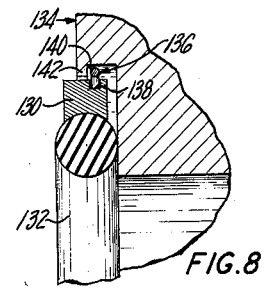
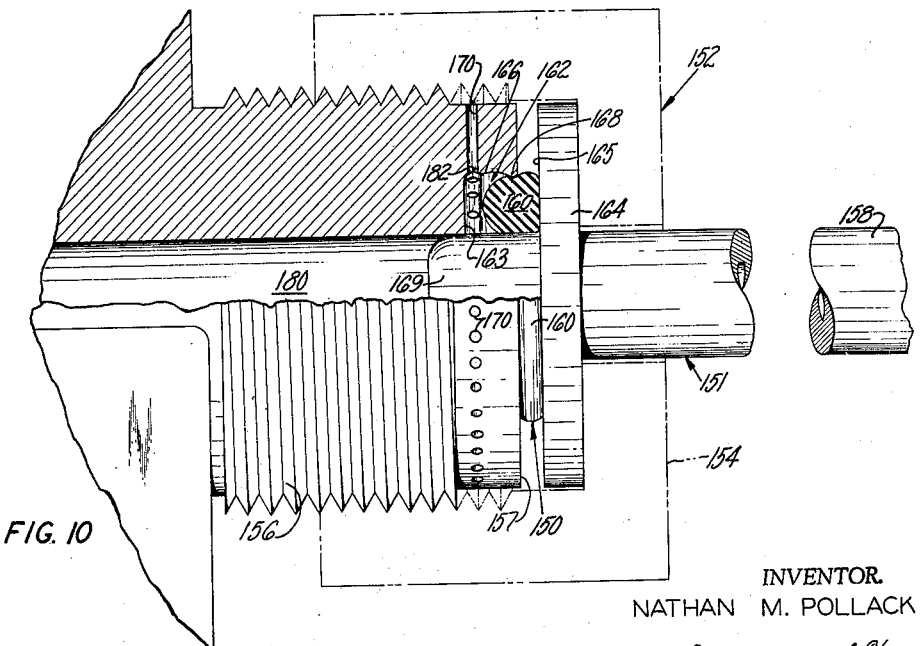

United States Patent Office 3,249,119
Patented May 3, 1966

3,249,119
SEAL ASSEMBLY
Nathan M. Pollack, New London Turnpike,
Marlborough, Conn.
Filed Nov. 15, 1962, Ser. No. 237,943
6 Claims. (Cl. 137—538)

This invention generally relates to seals and more specifically to an improved seal assembly utilizing a resilient O-ring for sealing separable joints, couplings, and the like in high pressure fluid chambers or conduits.

One of the objects of the present invention is to provide an improved resilient O-ring seal assembly that will effectively seal joints and the like which are subjected to extremely high pressures and that will also gradually release the pressure upon disconnection of the joint so as to render the disconnection highly safe as well as to increase the life of the seal by preventing "blow out" thereof.

A further object of the present invention is the provision of such a seal assembly that will remain positioned ready for use on one of the joint parts even after the parts have been completely disconnected and yet, may be easily installed or removed from its associated part to effect a replacement thereof, for example.

A still further object of the present invention is to provide such an improved seal assembly which may be economically manufactured with the inclusion of a standard O-ring and which is suitable for various applications wherein it will experience a long and useful life even though repeatedly subjected to extremely high pressure differentials.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a schematic view of a high pressure fluid distribution system shown to illustrate various applications of the seal assembly of the present invention;

FIG. 2 is a partially sectioned elevational view of a tank shown in fragment and an associated valve incorporating various preferred embodiments of the present invention;

FIG. 3 is an elevational view of a medical valve incorporating another preferred embodiment of the invention and shown as being mounted to an associated tank, the latter shown in fragment;

FIG. 4 is a fragmental and partial cross-sectional view taken generally along lines 4—4 of FIG. 3 and additionally showing a supply line and a mounting clamp therefor;

FIG. 5 is a front-elevational view of the embodiment of the seal assembly incorporated in the valve shown in FIG. 3;

FIG. 6 is a side view of the seal assembly shown in FIG. 5;

FIG. 7 is a view generally similar to FIG. 3 but showing another preferred embodiment of the seal assembly of the present invention;

FIG. 8 is a fragmental cross-sectional view taken generally along lines 8—8 of FIG. 7;

FIG. 9 is a front-elevational view of the embodiment of the seal assembly incorporated in the valve shown in FIG. 7; and FIG. 10 is a fragmental cross-sectional view showing still another embodiment of the seal assembly of the present invention.

Referring to the drawings in detail, FIG. 1 shows an illustrative environment of the seal assembly of the invention as including a supply tank 2 such as one containing compressed oxygen, an appliance 4 such as an artificial breathing device to be supplied by the tank 2, and a supply line including a tank valve 6 and an appliance shut-off valve 8. The tank valve 6 which is shown for illustrative purposes only, controls the fluid flow from the tank 2 to the supply line 10 by means of a conventional valve head and seat arrangement 12, 14, as shown in FIG. 2. The tank valve 6 is additionally provided with a frangible safety element 16 of the conventional type which is placed in communication with the inlet passage 18 by means of passage 20 and which is adapted to be ruptured by excessive pressure in the tank 2 to thereby vent the same through the safety vent passages 22.

An embodiment of the seal assembly of the present invention generally designated 30 is shown in FIG. 2 as being located at the outlet of the valve 6 where it seals the connection to the appliance supply line 10. In the embodiment of FIG. 2, the outlet connection or joint includes an adaptor tube 32 having one end positioned in alignment with the outlet passage 19 of a nipple 7 of the valve and the other end suitably secured to the appliance supply line 10, as shown in FIG. 1. The adaptor tube 32 is secured in the outlet passage 19 by means of a cap 34 which has threads 35 engaged with corresponding threads 11 on the nipple 7 of the valve, and which clamps a flange 36 integrally provided on the adaptor tube 32, against the end face 38 of a boss 39 integrally formed on the end of the outlet nipple 7.

In accordance with the invention, a resilient deformable, substantially incompressible O-ring 42 formed from rubber or the like is provided in an annular groove 40 formed on the inside surface of an axially extending flange on the end of the boss 39. The groove 40 is formed with a contour conforming to the O-ring 42 and with a diameter equal to or slightly greater than the inner diameter equal to or slightly greater than the inner diameter of the O-ring 42 so as to provide sufficient inter-engagement between the O-ring 42 and the boss 39 for holding the O-ring thereon as well as to substantially prevent inward radial deformation of the O-ring 42. The O-ring 42 is formed of sufficient thickness so that when the adaptor tube 32 is clamped in place, as shown in FIG. 2, the opposite, unsupported sides of the O-ring 42 will deformably engage the end surface 9 of the nipple 7 and the surface 37 of the flange 36 of the adaptor tube 32, to thereby establish a seal which will prevent the escape of fluid from the outlet passage 19 into the atmosphere.

In order to restrain outer radial deformation of the O-ring 42, a support or retaining ring 50 formed from metal or other suitable material is fixed to the O-ring 42 around the outer peripheral surface thereof through means of a groove 52 formed in the inner peripheral surface of the retaining ring 50 which groove 52 snugly receives the outer peripheral surface of the O-ring 42. The retaining ring groove 52 is formed with a contour conforming to the O-ring 42 and with a diameter equal to or slightly less than the outer diameter of the O-ring 42 so that the retaining ring 50 will be firmly held on the O-ring 42 and will substantially prevent outward radial deformation of the same. The ring 50 and the annular flange of boss 39 which provide annular groove 40 form a cage for restraining the O-ring against deformation in a radial direction and for retaining the seal assembly on the nipple 7 when the joint is disassembled. The thickness of the retaining ring 50 is less than the thickness of the O-ring 42 so as to provide a sealing bead on opposite sides of the O-ring 42 engageable with the surfaces 9, 37 to form the seal as described above. In the presently described application of the seal assembly, it has been found that forming the thickness of the retaining ring 50 approximately 25% less than that of the O-ring 42 provides good sealing results.

As shown in FIG. 2, it will thus be seen that the O-ring is supported in all directions against unwanted permanent deformation, the only deformation undergone by the O-ring 42 being that undergone by the sealing beads in effecting the seal and which is limited by the engagement of the adaptor flange 36 against the face of the retaining ring 50.

Referring now to FIG. 1, it will be apparent that when the valve 6 is open to provide gas under high pressure to the appliance 4, the gas in the appliance supply line 10 will reach the pressure of that in the tank 2. Thus, when valve or regulator 8 is closed, as when the use of the appliance 4 is discontinued, the pressure of the gas in supply line 10 will remain the same as that in the tank even though the tank shut-off valve 6 is closed to prevent the entry of more gas into the supply line 10 from the tank 2. Thus, if it is desired to disconnect the supply line 10 from the valve 6, means must be provided for the gradual venting of the high pressure gas from the supply line 10 to prevent the sudden "blow out" of the seal as the supply line is being disconnected from the nipple 7. The importance of this will be realized when it is recognized that a standard O-ring is formed of a resilient, relatively weak material, so that it will readily be deformed to continue to provide a seal between the sealing surfaces being uncoupled by the force of the high pressure gases acting on the surface of the seal which is exposed to the high pressure gas. This deformation of the O-ring may continue until the relatively weak O-ring is substantially unsupported against the high pressure at which time there will be an explosive release of the gas between the sealing surfaces of the joint with the O-ring being propelled out of the seal.

This invention provides a means for overcoming this problem by taking advantage of the tendency for the O-ring to deform to form a seal as long as possible to provide for the gradual release of the high pressure gas as the appliance supply tube 10 is being decoupled from the valve 6.

When the cap 34 is unthreaded to disconnect the supply line 10 from the valve 6, this extremely high pressure should it be acting on the O-ring 42 tending to move it towards the flange 36, will be effective to so move the O-ring 42 and such movement will be accommodated by the space provided to the right to the flange 36 (as viewed in the drawings) as a result of the unthreading of the cap 34. Since the retaining ring 50 is not integral with the nipple 7, the retaining ring 50 will move axially with the O-ring and will thereby provide an annular clearance passage (not shown) between the retaining ring 50 and the surface 9 for gradually venting the high pressure as the cap 34 is unthreaded. In this manner, the seal assembly 30 of the invention does not move out of the radial confining influence of ring 50 which insures against explosive release of pressure upon disconnection of the supply line 10 to thereby prevent "blow out" of the O-ring as well as to avoid injury to persons nearby.

Additionally, with the present invention, the O-ring 42 and its retainer 50 are secured to nipple 7 in position for subsequent use on the valve 6 when the appliance supply line 10 and cap 34 are reattached to the valve 6. However, should it be desired to replace the O-ring 42, this may be easily and quickly effected by axially withdrawing the O-ring from its groove 40 and snapping the replacement therein.

Another embodiment of the seal assembly generally designated 60 is shown in FIG. 2 as providing a seal at the inlet connection to the valve 6 between the base of the valve 6 and the neck of the tank 2, the connection being effected in the shown embodiment through means of a nipple 54 having threads 56 cooperable with threads 57 provided in the mouth of the tank 2. With the exception of size, the O-ring 62, retaining ring 64, and groove 66 in the valve body which mounts the O-ring and the retaining ring thereto, are formed in the same manner as in the above-described embodiment 30, to establish a seal contacting the surfaces 67 and 68 of the valve body and tank, respectively.

It will be seen that, when the valve body is unscrewed from the tank 2, any pressure acting on the O-ring 62 tending to force the O-ring towards the tank 2 will move the O-ring 62 together with its retaining ring 64 towards the tank surface 68 which will result in the provision of a space or vent passage between the retaining ring 64 and the valve surface 67, through which the pressure will be gradually vented to the atmosphere as the valve body is being unthreaded from the tank 2.

Another embodiment of the seal assembly generally designated 70 is shown in FIG. 2 as providing a seal between the safety vent plug 72 and the safety outlet nipple 74 of the valve 6. However, the seal assembly 70 is mounted to the valve body by means of a hollow stud or sleeve 76 press fitted into a recess 78 provided in the outlet passage 20. The sleeve 76 is provided with a flange 79 at one end, having an annular groove 80 formed to receive the O-ring 82 in the same manner described in connection with the above embodiments. Likewise, the retaining ring 84 in cooperation with the flange 79 of the sleeve 76 form a cage for restraining the O-ring 82 against movement in a radial direction and for retaining the seal assembly on the nipple 74.

Thus, in this application of the seal assembly 70, the latter will insure against an explosive pressure release when the safety plug 72 is loosened from the valve body for example when it is desired to replace the safety plug. Moreover, a seal assembly made according to this invention makes it possible to mount a safety vent plug without leakage even though the safety plug 72 is made only finger tight. Thus, this invention eliminates the need to apply a high torque to safety plug 72 which sometimes in the past has caused the shearing of nipple 74.

Referring to FIG. 3, another seal assembly generally designated 90 embodying the invention is shown as installed in a conventional medical valve 92 mounted in the top of an associated supply tank 94. In this embodiment, the O-ring 96 is supported against outer radial deformation by a retaining ring 98 which receives the O-ring 96 generally in the same manner as described above except that the thickness of the retaining ring 98 is formed less than the O-ring 96, with a greater percentage than that described above in connection with the seal assembly 30. However, the O-ring 96 together with its retaining ring 98 are mounted in a recess 100 provided in the valve body around the outlet port 102, by means of a pair of outwardly projecting ears 104 integrally provided on the retaining ring 98 as shown in FIG. 5. The ears 104 are adapted to engage lip portions 106 formed in the valve body in partial overlying relationship to the recess surface 108 thereof as shown in FIG. 4, to thereby limit axial movement of the retainer ring 98 and therefore the O-ring 96.

As shown in FIG. 4, the supply line 110 is adapted to be connected to the outlet passage 101 of the valve 92 through means of a conventional yoke-type clamp generally designated 112, having a passage 114 adapted to be placed in communication with the outlet passage 101 of the valve 92. When the clamp 112 is mounted to the valve body (as shown in FIG. 4) to connect the supply line 110 to the outlet of the valve, the O-ring 96 will deformably engage the surface 116 of the clamp 112 and the recess surface 108 of the valve body to establish a seal therebetween.

In order to provide support for the O-ring 96 so as to prevent inward radial deformation thereof, the clamp 112 is provided with a hollow lug or annular tip 118 which extends through the O-ring 96 into the outlet passage 101 and which is dimensioned to engage the inner periphery of the O-ring 96 to prevent inward radial deformation thereof. It will be seen that when the clamp 112 is dismounted from the valve body 92 to disconnect the supply line 110, the retaining ring 98 together with its O-ring 96 will be free to limitedly move axially to the left in response to fluid pressure acting behind the O-ring (as viewed in FIG. 4) so as to provide a space or passage between the retaining ring 98 and the recess surface 108 for venting the pressure to the atmosphere while radially confining O-ring 96 to prevent "blow-out" of the O-ring.

As indicated above, the valve body 92 is provided with the grooves or slots 120 (see FIG. 3) which open into the recess 100 and are dimensioned so as to permit the ears 104 of the retaining ring 98 to be received therethrough. If desired, an indicator, such as the arrows 122 may be provided on the retaining ring 98 so as to facilitate the proper orientation of the retaining ring 98 for securement in the recess 100 of the valve body 92.

Referring to FIGS. 7-9, an alternative arrangement for mounting the retaining ring 130 together with its O-ring 132, to the valve body 134, is shown as comprising a split spring 136 formed of a suitable resilient material, secured on the retaining ring 130 by means of an external annular groove 138 provided in the retaining ring 130 and receiving the split spring 136 as shown in FIGS. 8 and 9. The split spring 136 is formed with a plurality of circumferentially spaced bumps or ears 140 adapted to engage the lip portion 142 in the valve body to limit axial movement of the retaining ring 130 as well and its O-ring 132. Insertion or removal of the retaining ring 130 together with its O-ring 132 from the valve body 134 is made possible by simply depressing the ears 140 to clear the same from the lip portion 142.

Turning to FIG. 10, still another embodiment of the seal assembly generally designated 150 is shown therein in conjunction with a joint or coupling generally designated 152 similar to that shown in FIG. 2 and including a cap 154 and an outlet nipple 156 which are shown in FIG. 10 as being in an untightened or loose position such as is obtained when the cap 154 is unthreaded to initiate the disconnection of the supply line 158 from the outlet nipple 156.

The seal assembly 150 includes an O-ring 160 mounted in a recess 162 formed in the end face 157 of the nipple 156, the O-ring 160 having a greater thickness than the depth of the recess 162 so that when the cap 154 is threaded to clamp the flange 164 against the end face 157 of the nipple 156, the opposite sides of the O-ring 160 will deformably engage the surfaces 163 and 165 of the recess 162 and flange 164, respectively, to establish a seal therebetween.

In order to insure that the O-ring 160 will be retained in the recess 162, the maximum diameter of the recess 162 is made equal to or slightly less than the outer diameter of the O-ring 160 and the annular wall 166 of the recess 162 is contoured to conform to the O-ring 160 and to provide a lip 168 adapted to engage the O-ring 160 (as exaggeratedly shown in FIG. 10) to prevent removal of the O-ring from the nipple recess 162. The annular wall 166 of the recess 162 further serves to support the O-ring 160 against outward radial deformation of the O-ring 160 when fluid or mechanical clamping pressure is applied thereto.

Inward radial deformation of the O-ring 160 is substantially prevented in this embodiment by the forward portion 169 of the adaptor tube 151 which portion 169 is dimensioned to extend through the O-ring 160 and engage the inner peripheral surface thereof as shown in FIG. 10.

In accordance with the invention, there is provided a means for venting to the atmosphere, pressure that might accumulate behind the O-ring 160, which in the shown embodiment comprises a plurality of circumferentially spaced radially extending passages 170 formed in the nipple 156 at the juncture of the recess 162 and sealing surface 163 with each passage 170 having one end opening into the atmosphere and the other end opening into the recess 162.

It will thus be seen that when the O-ring 160 is clamped against the surface 163 of the recess 162 to effect the seal, the passages 170 will be closed from communication with the outlet passage 180, by the O-ring 160. However, when the cap 154 is unthreaded to disconnect the supply line 158, high pressure acting behind the O-ring 160 will tend to cause the O-ring 160 to "walk-out" of the recess 162 to the position shown in FIG. 10 to thereby open the vent passages 170 to gradually release the pressure as the cap 154 is being uncoupled. Thus, the vents 170 provide gradual dissipation of the pressure of the gas in tube 151 thereby to prevent the sudden "blow-out" of the O-ring 160 between the flanges 164 and the wall 166 as would occur in the absence of the vents 170.

The wall 166 of the recess 162 may be provided with an annular groove such as the groove 182 connecting the mouths of the vent passages 170 so as to insure that the fluid pressure will be vented, should several of the passages 170 become clogged or should the O-ring 160 be unevenly subjected to pressure whereby axial movement in response to such pressure would not be sufficient to open all the vent passages 170.

As will be apparent to persons skilled in the art, various modifications and adaptations of the structure above described will become readily apparent without departure from the spirit and scope of the invention, the scope of which is defined in the appended claims.

I claim:

1. In combination with two separable joint parts and the like having surfaces positioned in general overlying relationship for sealing a chamber, a seal assembly for the parts comprising a resilient deformable substantially incompressible O-ring positioned between the surfaces and in engagement therewith to effect a seal therebetween, a projection on one of the parts having an annular bearing surface receiving the O-ring to support the same against inward radial deformation, a retaining ring fixed to the O-ring with the outer periphery of the O-ring engaging the inner periphery of the retaining ring, and means mounting the retaining ring together with the O-ring on one of the parts for relative axial movement with respect to both of the parts and for maintaining the retaining ring together with the O-ring secured on said second-mentioned one part when the parts are separated.

2. The combination as defined in claim 1 wherein the retaining ring is mounted to the part having said projection.

3. In combination with two separable joint parts and the like having surfaces positioned in general overlying relationship for sealing a chamber, a seal assembly for the parts comprising an annular projection extending from one of the surfaces and having an annular external groove, a substantially incompressible, resilient O-ring received in said groove and engaging said surfaces to thereby effect a seal therebetween, said groove and said O-ring being constructed and dimensioned such that the O-ring and the surface of the groove are in inter-engagement to thereby retain the O-ring on said one part but to permit limited axial movement of the O-ring when the parts are separated, and a movable retaining ring having an internal annular groove receiving the outer periphery of the O-ring, said groove of the retaining ring being dimensioned such that the retaining ring is fixed to the O-ring for limited axial movement therewith.

4. In combination with first and second separable joint parts and the like having end surfaces positioned in general overlying relationship, the first part having a passageway to be sealed, a seal assembly for the parts comprising, a hollow stud mounted in the passageway with a pressed fit and having an end flange projecting beyond said surface of said first part, said flange having an annular groove, a resilient substantially incompressible O-ring received in the groove of the annular flange for engaging both of said surfaces to thereby establish a seal therebetween, and a movable annular retaining ring having a groove in the internal peripheral surface thereof for receiving the O-ring to support the same against outward radial deformation, said groove in the stud flange being dimensioned to engage the inner peripheral surface of the O-ring for maintaining the O-ring and the retaining ring secured on said first part when the parts are separated and for limited axial movement during the decoupling thereof.

5. In combination with first and second separable joint parts and the like having end surfaces positioned in general overlying relationship, the first part having a passageway to be sealed, a seal assembly for the parts comprising, a hollow stud removably secured in the passageway and having an end flange projecting beyond said surface of said first part, said flange having an annular groove, a resilient substantially incompressible O-ring received in the groove of the annular flange for engaging both of said surfaces to thereby establish a seal therebetween, and a movable annular retaining ring having a groove in the internal peripheral surface thereof for receiving the O-ring to support the same against outward radial deformation, said groove in the stud flange being dimensioned to engage the inner peripheral surface of the O-ring for maintaining the O-ring and the retaining ring secured on said first part when the parts are separated and for limited axial movement during the decoupling thereof.

6. In combination with two separable joint parts and the like movable away from each other and having surfaces in general overlying relationship for sealing a high pressure chamber, a seal assembly for the parts comprising a deformable O-ring positioned between the surfaces and in engagement therewith to effect a seal therebetween, means mounting and securing the O-ring on one of the parts for limited axial movement of the O-ring towards the other part in response to fluid pressure in the chamber when the parts are initially moved away from each other for decoupling, said mounting and securing means comprising a first annular member surrounding and engaging the outer periphery of the O-ring and a second annular member engaging the inner periphery of the O-ring and cooperating with said first annular member for supporting the O-ring in the radially outward and inward directions, and means providing communication between said one part and said first annular member for venting the chamber to the atmosphere as the parts are moved apart and upon said axial movement of the O-ring.

References Cited by the Examiner

UNITED STATES PATENTS

| | | | |
|---|---|---|---|
| 731,379 | 6/1903 | Martin | 285—379 X |
| 744,506 | 11/1903 | Dixon | 285—379 X |
| 1,027,565 | 5/1912 | Ramage | 285—379 |
| 2,208,353 | 7/1940 | Woolley | 285—379 X |
| 2,455,982 | 12/1948 | Dowty. | |
| 2,726,104 | 12/1955 | Boitnott et al. | |
| 2,919,147 | 12/1959 | Nenzell | 285—347 |
| 3,173,712 | 3/1965 | Zahurance et al. | 285—349 |

M. CARY NELSON, *Primary Examiner.*

W. R. CLINE, *Examiner.*